United States Patent [19]
Schipper

[11] Patent Number: 5,914,686
[45] Date of Patent: Jun. 22, 1999

[54] UTILIZATION OF EXACT SOLUTIONS OF THE PSEUDORANGE EQUATIONS

[75] Inventor: John F. Schipper, Palo Alto, Calif.

[73] Assignee: Trimble Navigation Limited, Sunnyvale, Calif.

[21] Appl. No.: 08/906,485

[22] Filed: Aug. 5, 1997

Related U.S. Application Data

[63] Continuation of application No. 08/792,841, Jan. 11, 1997.
[51] Int. Cl.$^6$ .............................. H04B 7/185; G01S 5/02
[52] U.S. Cl. ........................................... 342/357; 701/213
[58] Field of Search ............................. 342/357; 701/213

[56] References Cited

U.S. PATENT DOCUMENTS

| | | | |
|---|---|---|---|
| 4,463,357 | 7/1984 | MacDoran | 343/460 |
| 4,894,662 | 1/1990 | Counselman | 342/357 |
| 4,918,609 | 4/1990 | Yamawaki | 364/449 |
| 4,972,431 | 11/1990 | Keegan | 375/1 |
| 5,017,926 | 5/1991 | Ames et al. | 342/353 |
| 5,111,209 | 5/1992 | Toriyama | 342/357 |
| 5,146,231 | 9/1992 | Ghaem et al. | 342/419 |
| 5,148,179 | 9/1992 | Allison | 342/357 |
| 5,266,958 | 11/1993 | Durboraw, III | 342/357 |
| 5,323,163 | 6/1994 | Maki | 342/357 |
| 5,323,322 | 6/1994 | Mueller et al. | 364/449 |
| 5,359,521 | 10/1994 | Kyrtsos et al. | 364/449 |
| 5,680,313 | 10/1997 | Whittaker et al. | 340/436 |

OTHER PUBLICATIONS

Tom Logsdon, "The Navstar Global Positioning System," pp. 1–91, Van Nostrand Reinhold, 1992.

"Navstar GPS Space Segment/Navigation User Interfaces," Interface Control Document GPS(200), No. ICD–GPS–200, Rockwell International, Satellite Systems Division, Rev. B–PR, IRN–200B–PR–001, Apr. 16, 1993.

Alfred Leick, "GPS Satellite Surveying," 2nd edition, pp. 247–285, John Wiley & Sons, Jan. 1995.

*Primary Examiner*—Theodore M. Blum
*Attorney, Agent, or Firm*—John Schipper

[57] ABSTRACT

A system for determining exact solutions of the pseudorange equations obtained from measurements of location determination (LD) signals received from N LD signal sources by a mobile LD station. The LD signal sources may be part of a GPS, a GLONASS, LEO or any other satellite-based or ground-based LD system, such as Loran. Squares of differences of the pseudorange equations are subtracted from each other to produce N−1 linear relations between the unknown location coordinates x, y and z and the receiver clock offset b. These linear relations are used in one or more squares of pseudorange equations to produce a quadratic equation in b, or in x, y or z. A physically realistic solution b is found and used to determine the remaining unknown coordinates (x,y,z). No iteration or approximation is required. For $N \geq 5$, the approach extends to situations where the clock offset varies with time. For $N \geq 5$, another approach determines the minimum radius sphere that contains all LD signal antenna locations produced by application of the invention to sets of four LD signals for all permutations of constellations of four LD signal sources. For $N \geq 5$, another approach uses mean square error minimization to determine the solution set (x,y,z,b). The invention allows use of less complex receiver clocks and allows simpler and faster signal processing to determine the solution set (x,y,z,b).

24 Claims, 3 Drawing Sheets

UTILIZATION OF EXACT SOLUTIONS OF THE PSEUDORANGE EQUATIONS

FIELD OF THE INVENTION

This application is a Continuation of U.S. Ser. No. 08/792,841, filed on Jan. 11, 1997. This invention relates to utilization of measurements of signals received from a location determination system, such as a Satellite Positioning System.

BACKGROUND OF THE INVENTION

Time delays associated with timed signals received from location determination (LD) signal sources, such as satellites in a Global Positioning System (GPS), Global Orbiting Navigation Satellite System (GLONASS), or other Satellite Positioning System (SATPS), or such as ground-based signal towers in a Loran system, are used to estimate the distance of each LDS signal source from the LDS receiver of such signals. In a conventional approach, a time delay associated with the LDS signal received from each satellite is determined and expressed in code phase as a pseudorange value. The pseudorange values are modeled as arising from the line-of-sight (LOS) distance from the satellite to the LDS receiver, plus additive terms due to additional time delays arising from propagation of the signal through the ionosphere and through the troposphere, multipath signal production and propagation, and other perturbations. These perturbations are often estimated and approximately removed by modeling the effects of such perturbations. The modeled pseudorange value for each satellite, with or without these perturbations removed, includes a square root term that models the as-yet-unknown LOS Euclidean distance. A solution for this system of pseudorange equations involves the three spatial coordinates (x,y,z) for the LDS receiver and the absolute time t (or time offset) at which the pseudorange values were measured. This solution (x,y,z,t) is conventionally estimated by iterative estimation of the system of equations or by linearized estimation of the desired solution, using a known "exact" solution $(x_n, y_n, z_n, t_n)$ for this group of satellites that is in some sense "near" the desired solution. If this system of pseudorange equations is overdetermined, because N>4 independent pseudorange values are measured, the choice of solution of this system must somehow be optimized with respect to one or more criteria related to statistical and/or geometric attributes of the pseudorange measurements.

Static error as well as drift or dynamic error in a satellite clock can be monitored and corrected for quite accurately as time changes. Static error in a receiver clock, often referred to as "clock offset," is often determined as one of the unknowns. This approach ignores the possibility that receiver error is dynamic and changes with the passage of time.

Several workers have worked with or manipulated pseudorange or a similar variable in determining the distance from a satellite, whose location as a function of time is known, to a location on or near the Earth's surface whose location coordinates are not yet known.

Counselman, in U.S. Pat. No. 4,894,662, discusses some of the problems encountered in acquiring a lock on LD signals received from GPS satellites and making accurate pseudorange measurements and discusses filtering techniques that are suitable to obtain such measurements.

U.S. Pat. No. 4,918,609, issued to Yamawaki, discloses a system that uses two geosynchronous satellites and a mobile station, referred to collectively as "stations" here, on or near the Earth's surface, each being equipped with a transmitter, receiver, antenna and clock for communication with each other. One or both satellites and the mobile station emit range-finding signals that are received by the other two stations, and each station responds by transmission of its own range-finding signal. After each station has received the response signal from the other station or stations, the receiving station determines the total time for propagation of its own transmitted signal and for propagation of the response signal from a station that received the originally transmitted signal. Time errors for the station clocks are estimated and used to synchronize the station clocks and to determine the mobile station location, if the satellite locations are known accurately. Toriyama discloses a related approach in U.S. Pat. No. 5,111,209, in which timed signals are transmitted by a fixed reference station, with known location, through two geostationary satellites to the mobile station.

A method for obtaining pseudorange measurements from encrypted P-code signals, received from GPS satellites, is disclosed by Keegan in U.S. Pat. No. 4,972,431. Use of these pseudorange measurements to obtain the location of the GPS signal receiver is not discussed in much detail.

Ames et al, in U.S. Pat. No. 5,017,926, disclose a trilateralization method for estimating the location of an LD receiver on a known surface, such as the Earth's surface, using LD signals received from two satellites with known locations and from a fictitious satellite located at the Earth's center.

In U.S. Pat. No. 5,148,179, Allison discloses use of double differences of pseudorange measurements and carrier phase measurements between first and second GPS signal receivers (one reference, one mobile) and N ($\geq 4$) GPS satellites to determine location coordinates for a first GPS receiver. The GPS reference receiver must have known location coordinates, and this approach produces N−1 non-linear equations that must be solved for the location coordinates and other variables.

A direction indicating system that receives and analyzes pseudorange and carrier phase signals from GPS satellites is disclosed by Durboraw in U.S. Pat. No. 5,266,958. Pseudorange signals are received at a mobile receiver and used in a conventional manner to determine receiver location. The receiver is then moved in a closed path in a selected direction, and carrier phase measurements are analyzed to provide direction parameters, such as azimuthal angle. Another direction finder, which uses a GPS omnidirectional antenna, a GPS receiver, and a directional antenna, is disclosed by Ghaem et al in U.S. Pat. No. 5,146,231.

Maki discloses use of GPS Dilution Of Precision (DOP) parameters for each visible four-satellite constellation to analyze and assign weights to the location solutions obtained for each of these constellations, in U.S. Pat. No. 5,323,163. A least squares location solution, based on the DOP-weighted four-satellite locations, is found for the GPS receiver location.

Use of a network of differential GPS reference stations to measure and construct a plurality of iso-pseudorange-correction (iso-PRC) contours associated with each visible GPS satellite is disclosed in U.S. Pat. No. 5,323,322, issued to Mueller et al. The iso-PRC contours for all visible satellites are then used to provide mathematical approximations for the differential corrections applicable to pseudorange measurements made at any location served by this network.

U.S. Pat. No. 5,359,521, issued to Kyrtsos et al, discloses analysis of pseudorange measurements at each of two or more adjacent GPS antennas, whose separation distances are precisely known, to obtain an optimized estimate of the location of one of the antennas.

Most of these approaches do not work exclusively with the pseudorange equations to determine the location coordinates of a mobile station, and some require use of geosynchronous satellites for whatever measurements are made and used. Further, these approaches do not allow straightforward location determination where the system is overdetermined (i.e., information from the satellite locations is more than is required for an exact location solution) or is under-determined, or where the receiver clock error changes substantially with time. A more useful approach would provide these advantages and would allow the user a choice of determination of the user location in which (1) information from each LD signal source is used symmetrically or (2) information from one or more LD signal sources, whose accuracy, geometric location or other attribute is enhanced relative to information from the remaining LD sources, occupies a more central position.

SUMMARY OF THE INVENTION

These needs are met by the invention, which provides an approach for determination of the location coordinates and clock offset for a mobile station or other user, where the clock offset can be static or can vary with time. If M location coordinates (M=1, 2, 3) plus a static clock offset are to be determined, pseudorange measurements from M+1 LD sources are required. If the clock offset is assumed to be dynamic and to vary with time according to a power law or some other reasonably well behaved analytic model, pseudorange measurements from M+2 or more LD sources are required to determine the location coordinates and clock offset for the user. In the static(dynamic) clock offset situation, if pseudorange measurements from at least M+2 (M+3) sources are available, the location coordinates and clock offset are determined by minimization of an error sum. LD sources may be synchronous or non-geosynchronous satellites, a mixture of these two, or ground-based sources.

DETAILED DESCRIPTION OF THE PREFERRED EMBODIMENTS

Figure 1:
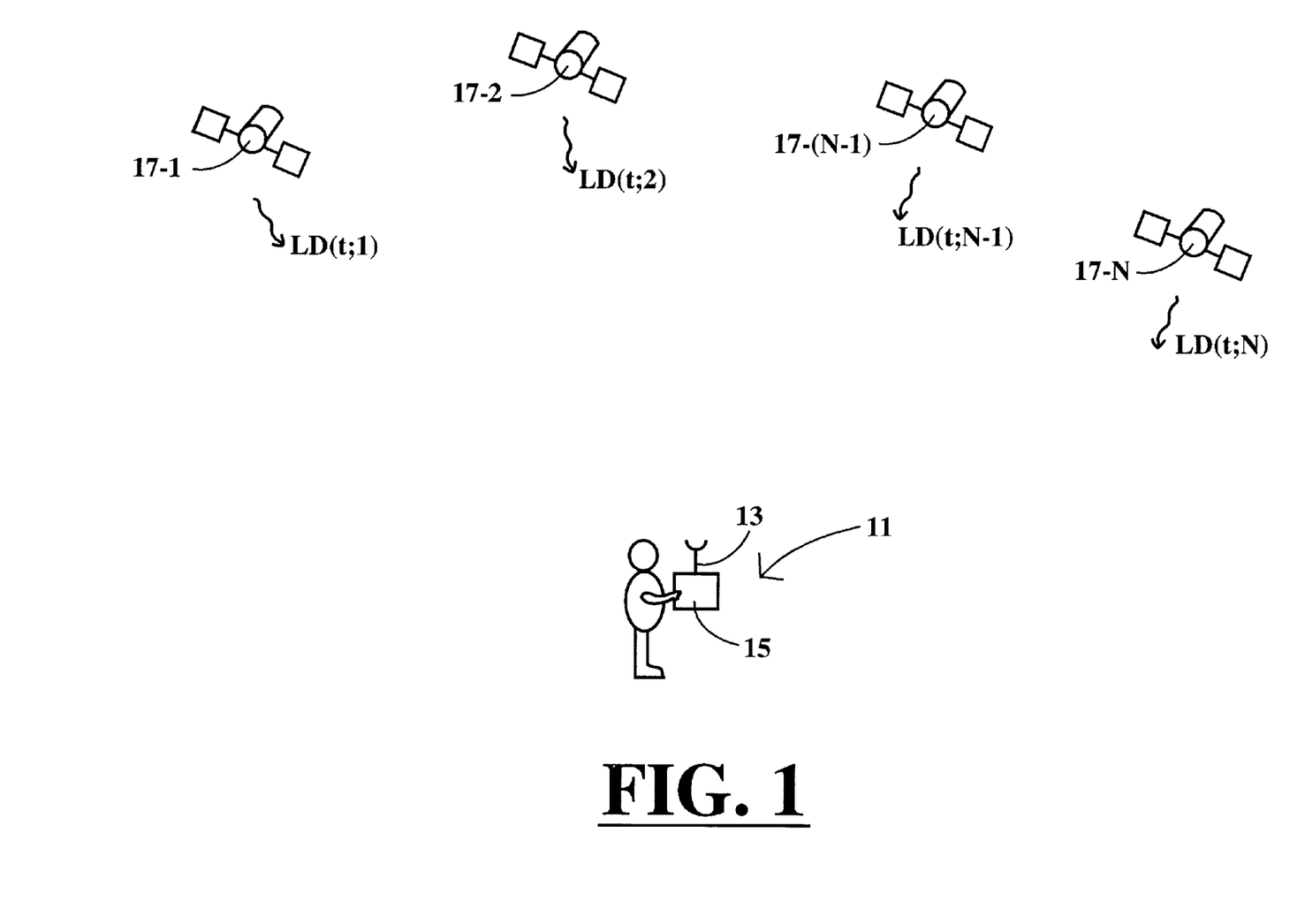
FIGS. 1 and 2 illustrate environments in which the invention is used.

In FIG. 1, a mobile LD station or LD receiver or other user 11 moves on or near the Earth's surface. The LD station 11 includes an antenna 13 that receives Satellite Positioning System (SATPS) signals from each of a plurality of N SATPS satellites (N≧2) 17-1, 17-2, . . . , 17-N, whose location coordinates $(x_n(t), Y_n(t), z_n(t))$ (n=1, . . . , N) vary in a known manner with time t. The satellites may be geosynchronous or non-geosynchronous. As used herein, an "SATPS satellite" is any satellite whose location coordinates are known with reasonable accuracy as a function of time, where the satellite transmits one or more streams of distinguishable, time-coded electromagnetic ("em") signals, preferably coded using FDMA and/or CDMA, that change with time in a known manner, that can be received by an electromagnetic signal receiver located on or near the Earth's surface and that can be distinguished from the signal stream(s) transmitted by another SATPS satellite. The SATPS signal sources 17-n (n=1, . . . , N) may also be ground-based towers that transmit em signals, or a mixture of satellite-based and ground-based SATPS signal sources can be used.

Each SATPS signal is received by the SATPS antenna 13 and passed to an SATPS receiver/processor 15 that (1) distinguishes the SATPS signals received from each SATPS satellite 17-n, (2) determines or measures the pseudorange, as defined in the following discussion, for satellite 17-n and (3) determines the present location of the LD station 11 from these measurements. The approach used here for determination of the present location coordinates (x,y,z) for the LD station 11 is exact and non-iterative and allows determination of these coordinates in three, relatively straightforward steps (for N=4) that can each be interpreted geometrically. The result is a matrix equation relating the location coordinates and time offset linearly plus a quadratic equation involving only the time offset (or involving only one location coordinate).

Figure 2:
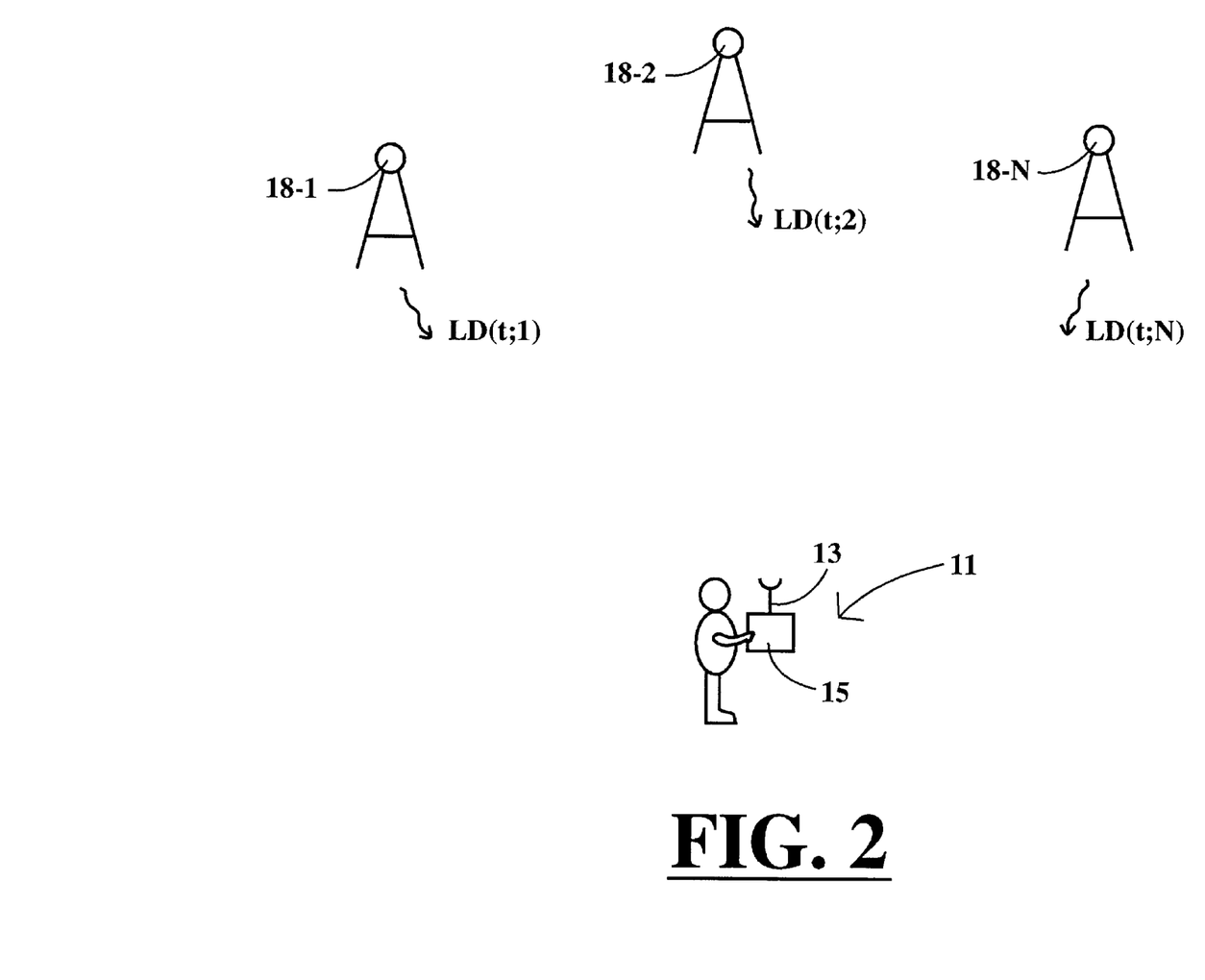

FIG. 2 illustrates an environment analogous to that shown in FIG. 1, except that the LD signal sources 18-1, 18-2, . . . , 18-N are a plurality of N ground-based signal towers that transmit time-coded em signals. The following discussion is equally applicable to LD signals received in an SATPS and LD signals received in a ground-based LDS, such as Loran, Tacan, Decca, Omega, JTIDS Relnav, PLRS and VOR/DME.

Assume that LD signals are received and that pseudorange measurements are made from each of N satellites or ground-based radiowave sources at the LD station 11, whose location coordinates (x,y,z) are unknown, at a time coordinate value t that is also unknown as yet. Adopting the notation of Alfred Leick, *GPS Satellite Surveying*, John Wiley & Sons, New York, Second Edition, 1995, pages 248–253, the pseudorange value PR(t;n) for an LD signal received from LD signal source number n at the LD receiver 11 at (approximate) time $t=t_{r,n}$ is given by $$PR(t=t_{r,n};n)=[(x-x_n)^2+(y-y_n)^2+(z-z_n)^2]^{1/2}==c(t_{r,n}+\Delta t_{r,n})-c(t_{s,n}+\Delta t_{s,n})-I_{r,s,n}-T_{r,s,n}+R_{r,s,n}, \quad (1)$$

where $(x_n,y_n,z_n)=(x_n(t_{s,n}),y_n(t_{s,n}),z_n(t_{s,n}))$ are the (approximately) known location coordinates for the nth LDS signal source at the time $(t=t_{s,n})$ an LD signal is transmitted, $\Delta t_{s,n}$ is the nth LD source clock error (assumed to be known at the LD station 11), $\Delta t_{r,n}$ is the receiver clock error (assumed to be approximately constant initially), c is a representative velocity of light propagation, $I_{r,s,n}$ is the LD signal propagation time delay in the ionosphere, $T_{r,s,n}$ is the LD signal propagation time delay in the troposphere, and $R_{r,s,n}$ accounts for any residual time difference (multipath, etc.). The four primary unknowns in Eq. (1) are x, y, z and the LD station receiver "clock offset"

$$b=c\,\Delta t_{r,n}. \quad (2)$$

The nominal clock times $t=t_{r,n}$ of receipt of the LD signals from different LD signal sources need not be the same for each LD signal source 17-n (or 18-n) but are assumed to be close for all sources n, preferably within a few milliseconds. Equation (1) can be rewritten for each of the LD sources 17-n (or 18-n) as $$[(x-x_1)^2+(y-y_1)^2+(z-z_1)^2]^{1/2}=b-\chi(t_{r,n};t_{s,1};1), \quad (3\text{-}1)$$

$$[(x-x_n)^2+(y-y_n)^2+(z-z_n)^2]^{1/2}=b-\chi(t_{r,n};t_{s,n};n), \quad (3\text{-}n)$$

$$[(x-x_N)^2+(y-y_N)^2+(z-z_N)^2]^{1/2}=b-\chi(t_{r,N};t_{s,N};N), \quad (3\text{-}N)$$

$$\chi(t_{r,n};t_{s,n};n)=c(t_{s,n}+\Delta t_{s,n})+I_{r,s,n}+T_{r,s,n}-c\,t_{r,n}. \quad (4)$$

where $\chi(t_{r,n};t_{s,n};n))$ is assumed to be known. Equations (3-1) and (3-n) ($1 \leq n \leq N$) can be rewritten in the form $$[(x-x_{1,n}-\Delta x_{1,n})^2+(y-y_{1,n}-\Delta y_{1,n})^2+(z-z_{1,n}-\Delta z_{1,n})^2]^{1/2}=b-\chi(t_{r,1};t_{s,1};1),\ (n=2,\ldots,N) \quad (3\text{-}1')$$

$$[(x-x_{1,n}+\Delta x_{1,n})^2+(y-y_{1,n}+\Delta y_{1,n})^2+(z-z_{1,n}+\Delta z_{1,n})^2]^{1/2}=b-\chi(t_{r,n};t_{s,n};n), \quad (3\text{-}n')$$

$$x_{1,n}=(x_1+x_n)/2, \quad (5)$$

$$y_{1,n}=(y_1+y_n)/2, \quad (6)$$

$$z_{1,n}=(z_1+z_n)/2, \quad (7)$$

$$\Delta x_{1,n}=(x_1-x_n)/2, \quad (8)$$

$$\Delta y_{1,n}=(y_1-y_n)/2, \quad (9)$$

$$\Delta z_{1,n}=(z_1-z_n)/2, \quad (10)$$

Subtracting the square of Eq. (3-n') from the square of Eq. (3-1') yields the linear relation $$\Delta x_{1,n}(x-x_{1,n})+\Delta y_{1,n}(y-y_{1,n})+\Delta z_{1,n}(z-z_{1,n})=A_{1,n}-B_{1,n}b, \quad (11)$$

$$A_{1,n}=\chi(t_{r,1};t_{s,1};1)^2-\chi(t_{r,n};t_{s,n};n)^2, \quad (12)$$

$$B_{1,n}=2[\chi(t_{r,1};t_{s,1};1)-\chi(t_{r,n};t_{s,n};n)]. \quad (13)$$

More generally, one can subtract the square of Eq. (3-k) from the square of Eq. (3-m) to produce a linear relation in x, y, z and b, viz.

$$\Delta x_{m,k}(x-x_{m,k})+\Delta y_{m,k}(y-y_{m,k})+\Delta z_{m,k}(z-z_{m,k})=A_{m,k}-B_{m,k}b\ (m\neq k;\ m,k=1,\ldots,N), \quad (14)$$

$$x_{m,k}=(x_m+x_k)/2, \quad (15)$$

$$\Delta x_{m,k}=(x_m-x_k)/2, \quad (16)$$

$$y_{m,k}=(y_m+y_k)/2, \quad (17)$$

$$\Delta y_{m,k}=(y_m-y_k)/2, \quad (18)$$

$$z_{m,k}=(z_m+z_k)/2, \quad (19)$$

$$\Delta z_{m,k}=(z_m-z_k)/2, \quad (20)$$

$$A_{m,k}=\chi(t_{r,m};t_{s,m};m)^2-\chi(t_{r,k};t_{s,k};k)^2, \quad (21)$$

$$B_{m,k}=2[\chi(t_{r,m};t_{s,m};m)-\chi(t_{r,k};t_{s,k};k)]. \quad (22)$$

Equation (11) provides N−1 linear relations between the location and clock offset variables $x-x_{1,n}$, $y-y_{1,n}$, $z-z_{1,n}$ and b in terms of the known or measurable time-dependent parameters $\Delta x_{1,n}$, $\Delta y_{1,n}$ and $\Delta z_{1,n}$ and the predictable or computable time-dependent parameters $A_{1,n}$ and $B_{1,n}$.

Assume that N=4 LD sources are visible initially from the mobile station 11 and that these four LD sources do not lie in a common plane. This can be implemented by choosing the four LD sources with the best Dilution of Precision (DOP) parameter, as discussed in Leick, op cit, pages 253–255. The three equations (11) for n=2, 3 and 4 can be restated in matrix form as $$\begin{bmatrix} \Delta x_{1,2} & \Delta y_{1,2} & \Delta z_{1,2} \\ \Delta x_{1,3} & \Delta y_{1,3} & \Delta z_{1,3} \\ \Delta x_{1,4} & \Delta y_{1,4} & \Delta z_{1,4} \end{bmatrix} \begin{bmatrix} x \\ y \\ z \end{bmatrix} = \begin{bmatrix} A'_{1,2}-B_{1,2}b \\ A'_{1,3}-B_{1,3}b \\ A'_{1,4}-B_{1,4}b \end{bmatrix}, \quad (23)$$

$$A'_{1,m} = A_{1,m} + (\Delta x_{1,m})(x_{1,m}) + (\Delta y_{1,m})(y_{1,m}) + (\Delta z_{1,m})(z_{1,m}) \quad (24)$$

$$(m = 2, 3, 4)$$

The 3×3 matrix and the 3×1 matrix on the left hand side of Eq. (23) are written as H and as $$R = \begin{bmatrix} x \\ y \\ z \end{bmatrix}, \quad (25)$$

respectively, and the 3×1 matrix on the right hand side of Eq. (23-1) is written as $$A' - Bb = \begin{bmatrix} A'_{1,2}-B_{1,2}b \\ A'_{1,3}-B_{1,3}b \\ A'_{1,4}-B_{1,4}b \end{bmatrix}. \quad (26)$$

If the four LD signal sources do not lie on a common plane, the matrix H is invertible, and Eq. (23) can be inverted to yield $$R = H'(A'-B\ b), \quad (27)$$

$$H' = H^{-1}, \quad (28)$$

so that x, y and z are known linear functions of the fourth variable b.

The fourth defining equation is obtained by squaring Eq. (3-1'), which yields a quadratic equation in the unknown clock offset b, namely $$([H'_{11}A'_{1,2} + H'_{12}A'_{1,3} + H'_{13}A'_{1,4} - x_{1,2} - \Delta x_{1,2} - (H'_{11}B_{1,2} + H'_{12}B_{1,3} + H'_{13}B_{1,4})b])^2 + \quad (29)$$

$$([H'_{21}A'_{1,2} + H'_{22}A'_{1,3} + H'_{23}A'_{14} - y_{1,2} - \Delta y_{1,2} - (H'_{21}B_{1,2} + H'_{22}B_{1,3} + H'_{23}B_{1,4})b])^2 +$$

$$([H'_{31}A'_{1,2} + H'_{32}A'_{1,3} + H'_{33}A'_{1,4} - z_{1,2} - \Delta z_{1,2} - (H'_{31}B_{1,2} + H'_{32}B_{1,3} + H'_{33}B_{1,4})b])^2 =$$

$$([b - \chi(t_{r,1};t_{s,1};1)])^2,$$

where $H'_{ij}$ is the entry in the matrix $H'=H^{-1}$ in the ith row and jth column. Equation (29) may be rewritten as $$E\ b^2 + 2F\ b + G = 0, \quad (30)$$

$$E = \sum_{i=1}^{3} \left[\sum_{j=1}^{3} H'_{ij}B_{1,j+1}\right]^2 - 1, \quad (31)$$

$$F = -\sum_{i=1}^{3} \left[\sum_{j=1}^{3} H'_{ij}B_{1,j+1}\right]\left[\sum_{k=1}^{3} H'_{ik}A'_{1,k+1} - C_{i+1}\right] + \chi(t_{r,1};t_{s,1};1), \quad (32)$$

-continued $$G = \sum_{i=1}^{3}\left[\sum_{j=1}^{3} H'_{ij}A'_{i,j+1} - C_{i+1}\right]^2 - \chi(t_{r,1}; t_{s,1}; 1)^2, \tag{33}$$

$$C_2 = x_{12} + \Delta x_{12}, \tag{34}$$

$$C_3 = y_{12} + \Delta y_{12}, \tag{35}$$

$$C_4 = z_{12} + \Delta z_{12}, \tag{36}$$

$$b = \{-F \pm [F^2 - E\,G]^{1/2}\}/E. \tag{37}$$

This last quadratic equation in b has two solutions, one of which is more consistent with the physical or geometrical constraints on b ($|b|$ small). The total solution set includes the N−1=3 linear equations set forth in Eq. (27) plus Eq. (37), which involves computation of a single square root of a known number. This is an improvement on the original set of defining relations, Eqs. (1) for n=1, 2, 3, 4, each of which requires computation of a square root and iterated computations to determine the solution coordinate set.

Equation (29) uses only Eq. (3-1) to obtain a quadratic equation in the clock offset variable b, and Eq. (3-1) is used to obtain each of the linear relations (11). Another approach, which treats all of the relations (3-n) more symmetrically, squares Eq. (3-k) and subtracts this from the square of Eq. (3-m) (m≠k; m, k=1, 2, . . . , N) to produce the general linear relation $$\Delta x_{m,k}(x-x_{m,k}) + y_{m,k}(y-y_{m,k}) + \Delta z_{m,k}(z-z_{m,k}) = = A_{m,k} - B_{m,k}\,b, \tag{38}$$

$$A_{m,k} = \chi(t_{r,n}; t_{s,n}; n)^2 - \chi(t_{r,k}; t_{s,k}; k)^2, \tag{39}$$

$$B_{m,k} = 2[\chi(t_{r,m}; t_{s,m}; m) - \chi(t_{r,k}; t_{s,k}; k)]. \tag{40}$$

The analog of Eq. (23) is then expressed more symmetrically as $$\begin{bmatrix}\Delta X_{1,2;3,4} & \Delta Y_{1,2;3,4} & \Delta Z_{1,2;3,4}\\\Delta X_{2,3;4,1} & \Delta Y_{2,3;4,1} & \Delta Z_{2,3;4,1}\\\Delta X_{1,3;2,4} & \Delta Y_{1,3;2,4} & \Delta Z_{1,3;2,4}\end{bmatrix}\begin{bmatrix}x\\y\\z\end{bmatrix} = \begin{bmatrix}A_{1,2;3,4} - B_{1,2;3,4}b\\A_{2,3;4,1} - B_{2,3;4,1}b\\A_{1,3;2,4} - B_{1,3;2,4}b\end{bmatrix}, \tag{41}$$

$$\Delta X_{i,j;k,l} = \Delta x_{i,j} - \Delta x_{k,l}, \tag{42}$$

$$\Delta Y_{i,j;k,l} = \Delta y_{i,j} - \Delta y_{k,l}, \tag{43}$$

$$\Delta Z_{i,j;k,l} = \Delta z_{i,j} - \Delta z_{k,l}, \tag{44}$$

$$A_{i,j;k,l} = A_{i,j} - A_{k,l} + (\Delta x_{i,j})(x_{i,j}) + (\Delta y_{i,j})(y_{i,j}) + (\Delta z_{i,j})(z_{i,j}) - -(\Delta x_{k,l})(x_{k,l}) - (\Delta y_{k,l})(y_{k,l}) - (\Delta z_{k,l})(z_{k,l}), \tag{45}$$

$$B_{i,j;k,l} = B_{i,j} - B_{k,l}. \tag{46}$$

The inverse of the 3×3 matrix on the left in Eq. (41) can be shown to exist and is denoted H″, and the 3×1 matrix on the right in Eq. (41) is denoted A″ −B″ b, where A″ and B″ are independent of the clock offset value b. Equation (41) is then inverted to produce the more symmetrical solutions $$R = \begin{bmatrix}x\\y\\z\end{bmatrix} = H''(A'' - B''b). \tag{47}$$

The inverses of the 3×3 matrices on the left side in Eqs. (23) and (42) are easily determined using the algebraic rules for inverses. For example, $$(H'')_{ij} = (-1)^{i+j}\mathrm{cof}(H_{ji})/\det(H)\ (i, j=1, 2, 3), \tag{48}$$

where $\mathrm{cof}(H_{ji})$ is the cofactor of the element $H_{ji}$ in the determinant of H.

A symmetric version of Eq. (29) or (30) is obtained by squaring each of Eqs. (3-n) (n=1, . . . , N) and adding these relations to produce a new quadratic equation in b, which is written as $$E'\,b^2 + 2F'\,b + G' = 0, \tag{49}$$

$$E' = N^2 = N\sum_{k=1}^{3}((HB)_k)^2, \tag{50}$$

$$F' = -2\sum_{m=1}^{4}\chi_m + \tag{51}$$

$$2N\sum_{k=1}^{3}\left(HB_k(HA)_k - 2\left(\sum_{m=1}^{3}x_m\right)(HB)_1 - 2\left(\sum_{m=1}^{3}y_m\right)(HB)_2 - 2\left(\sum_{m=1}^{3}z_m\right)(HB)_3\right),$$

$$G' = \sum_{m=1}^{4}\chi_m^2 - N\sum_{k=1}^{3}((HA)_k)^2 + \tag{52}$$

$$2\left(\sum_{m=1}^{4}x_m\right)(HA)_1 + 2\left(\sum_{m=1}^{4}y_m\right)(HA)_2 + 2\left(\sum_{m=1}^{4}z_m\right)(HA)_3,$$

$$(HA)_k = H''_{k1}A''_{1,2;3,4} + H''_{k2}A''_{2,3;4,1} + H''_{k3}A''_{1,3;2,4},\ (k=1, 2, 3), \tag{53}$$

$$(HB)_k = H''_{k1}B''_{1,2;3,4} + H''_{k2}B''_{2,3;4,1} + H''_{k3}B''_{1,3;2,4},\ (k=1, 2, 3), \tag{54}$$

$$\chi_m = \chi(t_{r,m}; t_{s,m}; m) - \chi(t_{r,k}; t_{s,k}; k), \tag{55}$$

where $H''_{ij}$ is the entry in the ith row and jth column of the matrix H″ and all other quantities are defined above. Equation (48) has two (real) solutions, $$b = \{-F' \pm [F'^2 - E'\,G']^{1/2}\}/E'. \tag{56}$$

one of which is more consistent with the practical constraints ($|b|$ is relatively small). Once the clock offset value b is determined, the location coordinates are found from Eq. (47).

Now consider the case where N≧5 LD signal sources are available. Equation (23) (or Eq. (41)) is written as $$H\,R = A' - B\,b, \tag{57}$$

where H is an (N−1)×3 matrix (non-square), R and A′ and B are (N−1)×1 column matrices, and N−1≧4. One can form the 3×(N−1) Hermitean adjoint, denoted H⁺, of the matrix H and apply the matrix $(H^+H)^{-1}H^+$ to Eq. (57) to produce the relation $$(H^+H)^{-1}H^+R = R = (H^+H)^{-1}H^+(A' - B\,b). \tag{58}$$

However, Eq. (58) represents an overdetermined group of equations, and any formal solution of Eq. (58) is likely to be restricted to a subspace solution, which satisfies some but not all of the N relations in Eq. (57).

Because Eq. (57) represents an over-determined set of equations, one can seek an approximate 4×1 solution vector S′ given by Str=(x′, y′, z′, b′) that is "as close as possible" to the true solution vector Str=(x, y, z, b) in some least mean square sense, by choosing solution vector components x′, y′, z' and b' that minimize an error parameter. For example, if Eq. (23) is utilized, the error sum might be $$\varepsilon = w_1[H_{11}x' + H_{12}y' + H_{13}z' - A'_{12} - B_{12}b]^2 + \qquad (59)$$
$$w_2[H_{21}x' + H_{22}y' + H_{23}z' - A'_{13} - B_{13}b]^2 +$$
$$w_3[H_{31}x' + H_{32}y' + H_{33}z' - A'_{14} - B_{14}b]^2 + \ldots +$$
$$w_{N-1}[H_{N-1,1}x' + H_{N-1,2}y' + H_{N-1,3}z' - A'_{1,N} - B_{1,N}b]^2 -$$
$$w_N[b - \chi(t_{r,1}; t_{s,1}; 1)]^2,$$

where $w_1$, $w_2$, $w_3$, $w_N$ are selected non-negative weight coefficients and the coefficients $A'_{1i}$ and $B_{1i}$ (i=2, 3, ..., N) are the row components of the A' and B matrices in Eq. (57). One can, of course, use uniform weight coefficients ($w_1 = w_2 = \ldots w_N$). Another suitable weight coefficient scheme allows the weight coefficients to depend on the PDOP, HDOP and/or VDOP parameters associated with different four-satellite constellations from among the N satellites (N≧5).

The situation where N≧5 LD signal sources are available can also be analyzed as separate subsystems of 4 distinct LD signal sources drawn from a group of N such sources, and a region of uncertainty for the present location of the LD signal antenna 13 can be estimated. Assume that no four of the LD antenna locations $L_k$ are coplanar. The situation N=5 is first examined for purposes of illustration. Five subsystems, numbered k=1, 2, 3, 4, 5, each including four of the LD signal sources, with LD signal source no. k being deleted in subsystem no. k, are analyzed according to the preceding discussion for N=4. An embodiment of the invention provides explicit location coordinates, written ($x_{a,k}$, $y_{a,k}$, $z_{a,k}$) or $L_k$, for the LD signal antenna location for subsystem no. k.

Given any four of these five locations $L_k$, such as $L_1$, $L_2$, $L_3$ and $L_4$ (subsystem 5), a unique sphere $S_{1,2,3,4}$ can be found that passes through these four locations, and the location coordinates ($x_0$, $y_0$, $z_0$)$_{1,2,3,4}$ of the center of this sphere are easily found. The sphere center satisfies the relations $$(x_{a,k}-x_0)^2+(y_{a,k}-y_0)^2+(z_{a,k}-z_0)^2=r^2(k=1,2,3,4), \qquad (60)$$

where r=r(1,2,3,4) is the as-yet-undetermined radius of the sphere $S_{1,2,3,4}$. Subtracting Eq.(60) for each of k=2, 3 and 4 from Eq. (60) for k=1, the resulting three equations can be rearranged in matrix form as $$\begin{bmatrix} x_{a,1} - x_{a,2} & y_{a,1} - y_{a,2} & z_{a,1} - z_{a,2} \\ x_{a,1} - x_{a,3} & y_{a,1} - y_{a,3} & z_{a,1} - z_{a,3} \\ x_{a,1} - x_{a,4} & y_{a,1} - y_{a,4} & z_{a,1} - z_{a,4} \end{bmatrix} \begin{bmatrix} x_0 \\ y_0 \\ z_0 \end{bmatrix} = \begin{bmatrix} (r_1^2 - r_2^2)/2 \\ (r_1^2 - r_3^2)/2 \\ (r_1^2 - r_4^2)/2 \end{bmatrix}, \qquad (61)$$

$$r_k^2 = x_{a,k}^2 + y_{a,k}^2 + z_{a,k}^2 \quad (k = 1, 2, 3, 4) \qquad (62)$$

Equation (61) can be written as $$M(1,2,3,4) \, X_0(1,2,3,4) = D(1,2,3,4), \qquad (63)$$

where M is the 3×3 matrix on the left, $X_0=[x_0 \, y_0 \, z_0]^{tr}$ is the 3×1 column matrix on the left and D is the 3×1 column matrix on the right in Eq. (61) for the four locations $L_1$, $L_2$, $L_3$ and $L_4$. The matrix M has a nonzero determinant, and is thus invertible, because the four locations $L_k$ (k=1, 2, 3, 4) are not coplanar. The location coordinates for the sphere center are then expressed in the form $$X_0(1, 2, 3, 4) = \begin{bmatrix} x_0 \\ y_0 \\ z_0 \end{bmatrix} = M(1, 2, 3, 4)^{-1} D(1, 2, 3, 4). \qquad (64)$$

The sphere radius squared, r(1,2,3,4)$^2$, is then obtained from Eq. (60) for any of the equations with k=1, 2, 3 or 4. One now computes the square of the distance of the location $L_5$ from the sphere center, viz.

$$r_{0,5}^2=(x_{a,5}-x_0)^2+(y_{a,5}-y_0)^2+(z_{a,5}-z_0)^2, \qquad (65)$$

and inquires whether $$r_{0,5}^2 \leq r(1,2,3,4)^2, \qquad (66)$$

is satisfied? If the answer to this inquiry is "yes," the location $L_5$ lies on the surface of or within the sphere $S_{1,2,3,4}$, and the pair $$P_{1,2,3,4}=(X_0(1,2,3,4), r(1,2,3,4)) \qquad (67)$$

is added to a set II. If the inequality in Eq. (66) is not satisfied, the pair ($X_0$(1,2,3,4), r(1,2,3,4)) is discarded.

The computations in the preceding paragraph are repeated for each of the other sets of four locations, namely {$L_1$, $L_2$, $L_3$, $L_5$}, {$L_1$, $L_2$, $L_4$, $L_5$}, {$L_1$, $L_3$, $L_4$, $L_5$}, and {$L_2$, $L_3$, $L_4$, $L_5$}, and the corresponding radius r and location coordinates (x0, y0, z0) for each of the respective spheres $S_{1,2,3,5}$, $S_{1,2,4,5}$, $S_{1,3,4,5}$, and $S_{2,3,4,5}$ are determined as in the preceding paragraph. Again one inquires if any of the inequalities $$r_{0,4}^2=(x_{a,4}-x_0)^2+(y_{a,4}-y_0)^2+(z_{a,4}-z_0)^2 \leq r(1,2,3,5)^2, \qquad (66')$$
$$r_{0,3}^2=(x_{a,3}-x_0)^2+(y_{a,3}-y_0)^2+(z_{a,3}-z_0)^2 < r(1,2,4,5)^2, \qquad (66'')$$
$$r_{0,2}^2=(x_{a,2}-x_0)^2+(y_{a,2}-y_0)^2+(z_{a,2}-z_0)^2 \leq r(1,3,4,5)^2, \qquad (66''')$$
$$r_{0,1}^2=(x_{a,1}-x_0)^2+(y_{a,1}-y_0)^2+(z_{a,1}-z_0)^2 \leq r(2,3,4,5)^2, \qquad (66'''')$$

is satisfied? If one of the preceding inequalities is satisfied, the corresponding pair $$P_{1,2,3,5}=(X_0(1,2,3,5), r(1,2,3,5)), \qquad (67')$$
$$P_{1,2,4,5}=(X_0(1,2,4,5), r(1,2,4,5)), \qquad (67'')$$
$$P_{1,3,4,5}=(X_0(1,3,4,5), r(1,3,4,5)), \text{ and/or} \qquad (67''')$$
$$P_{2,3,4,5}=(X_0(2,3,4,5), r(2,3,4,5)), \qquad (67'''')$$

is placed in the set II. Otherwise, the corresponding pair is discarded. After all five sets of four locations {$L_1$, $L_2$, $L_3$, $L_4$}, {$L_1$, $L_2$, $L_3$, $L_5$}, {$L_1$, $L_2$, $L_4$, $L_5$}, {$L_1$, $L_3$, $L_4$, $L_5$}, and {$L_2$, $L_3$, $L_4$, $L_5$}, have been analyzed in this manner, the set II contains at least one pair. Define $$\text{i } r_{min}=r(a,b,c,d)=\min_{(X_0(h,i,j,k), \, r(h,i,j,k)) \, \epsilon II}\{r(h,i,j,k)\}. \qquad (68)$$

The region of uncertainty of the location of the LD signal antenna 13 is then the sphere $S_{a,b,c,d}$, centered at $X_0(a,b,c,d)$, with radius r(a,b,c,d), and $X_0(a,b,c,d)$ can be designated as the location of the LD signal antenna 13 in this embodiment. The sphere $S_{a,b,c,d}$ and its radius $r_{min}$=r(a,b,c,d) can also be determined by seeking the smallest sphere radius for which that sphere contains all the locations $L_1$, $L_2$, $L_3$, $L_4$ and $L_5$. This analysis is easily extended to N LD signal sources with N≧5, where the number of sets of locations Lk taken four at a time is.

If N≦3 LD signal sources are available, Eq. (57) represents a group of under-determined equations. One could form the error parameter ε as in Eq. (59) and choose the components x', y', z' and b' to minimize ε again, with N≦3. This would produce a solution set that is confined to a (4-N)-dimensional subspace, such as a line or a plane, of the 4-dimensional solution space. One or more additional relations or constraints can be added to reduce the solution set to a point in the 4-dimensional solution subspace, as desired.

In one approach for N≦3, measurements from one or more additional instruments, such as altimeters or inertial sensing instruments, can be used to supplement Eqs. (57) and (58). These additional readings are included to provide a solution set of four coordinates (x,y,z,b) or one or more relations between the solution set coordinates.

In another approach for N≦3, one could confine the location of the LDS station antenna 13 to a known surface (useful for N=3) or to a known space curve, such as a railroad track (useful for N=2). Alternatively, one could assume that a highly accurate clock provides the time at the LDS signal receiver/processor (useful for N=3).

In any measurement of pseudorange values, the LDS signals are received at the LDS antenna and receiver/processor at slightly different receiver times $t=t_{r,n}$ (n=1, ... , N). By assuming that the same receiver clock offset b is applicable at each of these LDS signal arrival times, one implicitly assumes that this clock offset b is constant in the time interval in which the N measurements are made. This assumption is often, but not always, a good approximation. Where the LDS receiver clock manifests drift, the clock offset b will vary (modestly, one hopes) with time. For purposes of modeling receiver clock drift, it is assumed that the receiver clock offset time $\Delta t_{r,n}$ varies according to an arbitrary power law, viz.

$$c \, \Delta t_{r,n'} = b + a(t_{r,n})^p, \tag{69}$$

where a, b and p are non-zero constants, a and b are unknown and p is known or measurable. If the parameter p is also unknown, pseudorange measurements from one or more additional LDS sources are required. If p=0, the preceding situation where clock offset is recovered, with b+a replacing b therein. Equation (1) in the Summary is now written in an expanded form as $$PR(t = t_{r,n}; n) = [(x - x_n)^2 + (y - y_n)^2 + (z - z_n)^2]^{1/2} \tag{70}$$
$$= c(t_{r,n} + \Delta t_{r,n}) - c(t_{s,n} + \Delta t_{s,n}) - I_{r,s,n} - T_{r,s,n} + R_{r,s,n},$$
$$= a(t_{r,n})^p + b - \chi(t_{r,n}; t_{s,n}; n),$$

where $\chi(t_{r,n}; t_{s,n}; n)$ is defined in Eq. (4) and includes only known numerical terms. Forming the difference of the sum of the squares of Eq. (1) for n=m and n=k, the analog of Eq. (14) becomes $$\Delta x_{m,k}(x-x_{m,k}) + \Delta y_{m,k}(y-y_{m,k}) + \Delta z_{m,k}(z-z_{m,k}) = A_{m,k}a^2 + B_{m,k}ab + C_{m,k}a + D_{m,k}b + E_{m,k}, \tag{71}$$

$$A_{m,k} = (t_{r,m})^{2p} - (t_{r,k})^{2p}, \tag{71}$$

$$B_{m,k} = 2[(t_{r,m})^{2p} - (t_{r,k})^{2p}], \tag{73}$$

$$C_{m,k} = -2[(t_{r,m})^p \chi(t_{r,m}; t_{s,m}; m) - (t_{r,k})^{2p} \chi(t_{r,k}; t_{s,k}; k)], \tag{74}$$

$$D_{m,k} = -2[\chi(t_{r,m}; t_{s,m}; m) - \chi(t_{r,k}; t_{s,k}; k)], \tag{75}$$

$$E_{m,k} = \chi(t_{r,m}; t_{s,m}; m)^2 - \chi(t_{r,k}; t_{s,k}; k)^2, \tag{76}$$

where $A_{m,k}$, $B_{m,k}$, $C_{m,k}$, $D_{m,k}$ and $E_{m,k}$ are computed numerical quantities and are known. For this formulation, LDS signals from a minimum of N=5 LDS signal sources must be received and processed, and no four LDS signal sources should lie in a common plane.

By forming differences of the different relations (71), these relations are reduced a matrix relation of the form $$H'''R'' = (A''' - B'''b), \tag{77}$$

$$R' = \begin{bmatrix} x \\ y \\ z \\ a \end{bmatrix}, \tag{78}$$

where H''' is an invertible 4×4 matrix and A''' and B''' are known 4×1 column matrices. Equation (69) is inverted to read $$R' = (H''')^{-1}(A''' - B'''b), \tag{79}$$

and Eq. (79) is inserted into the square of one of Eqs. (1), or into a linear combination of the Eqs. (1), as in the preceding discussion, to produce a quadratic equation in b of the form $$E'' b^2 + 2F'' b + G'' = 0, \tag{80}$$

where E'', F'' and G'' have known numerical values. The quadratic equation (80) provides one realistic solution for b (|b| small), and this solution is inserted into Eq. (79) to produce the location coordinates x, y and z and the remaining clock offset parameter a. In many circumstances, manipulation of Eq. (71), which contains the unknown parameter combinations $a^2$ and ab, to produce the relation (77) that is linear in the parameters a and b requires a minimum of N=6 visible LDS signal sources. In fortuitous circumstances, a minimum of N=5 LDS signal sources will suffice here.

The preceding discussion covers several related approaches for determining exact solutions of equations for pseudorange measurements received in an LDS, including solutions where the receiver clock offset is not constant in time. Use of such an approach allows use of less precise (and less expensive) receiver clocks in the LDS receiver/processor that determines the present location coordinates and clock offset parameter(s) for the LDS antenna. Because this exact solution approach does not require iteration, determination of present location coordinates for an LD signal antenna should occur more quickly and should allow use of less complex (and less expensive) microprocessors in the LDS receiver/processors. Use of such an approach also allows explicit treatment, without use of iterative computation, of situations in which the number N of LDS signals received is greater than, or less than, the minimum number of such signals required for exact solution of the pseudorange equations.

After the solution coordinates (x,y,z,b) or (x,y,z,b,a) are determined for the LD signal antenna for a time approximately equal to $t=t_{r,n}$ (or to $t=\{t_{r,1}+ \ldots +t_{r,N}\}/N$), these coordinates can be displayed numerically and/or graphically and/or audibly on a suitable display for use by a user of the LD station 11.

Figure 3:
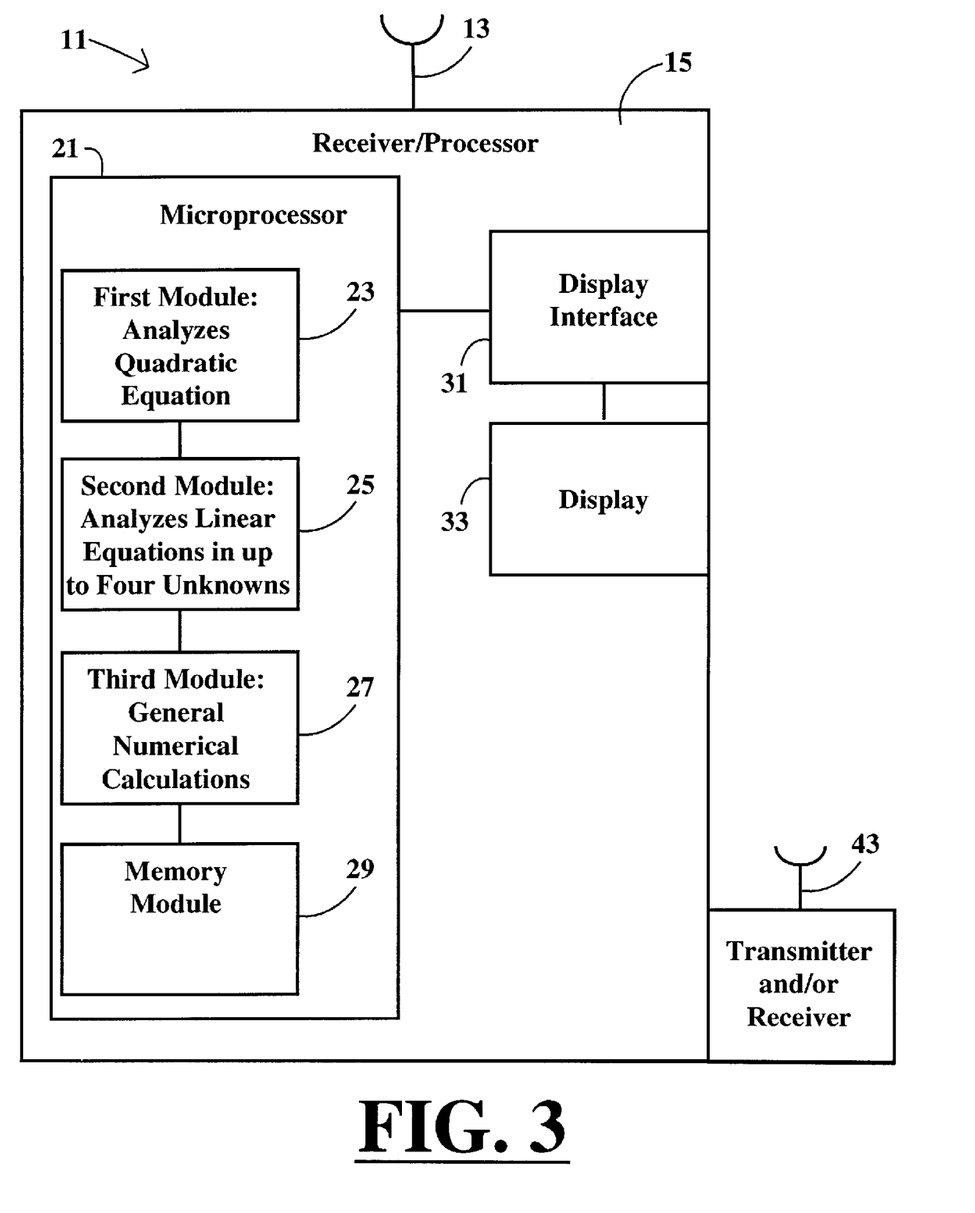
FIG. 3 illustrates apparatus suitable for practicing the invention.

FIG. 3 illustrates an embodiment of LD station apparatus 11 that is suitable for practicing the invention. The LD station apparatus 11 includes an LD signal antenna 13 and an LD signal receiver/processor 15. The LD receiver/processor 15 includes a microprocessor 21 having: a first programmed module 23 that receives, analyzes and determines the solution of a quadratic equation in one unknown; a second programmed module 25 that receives, analyzes and determines the solution of up to four linear equations in four unknowns; a third module 27 for general numerical calculations; a memory module 29 for storing the location coordinates $(x_n, y_n, z_n)$ (n=1, ... N; N≧2) for each of N LD signal sources (e.g., SATPS satellites or ground-based LD signal towers) at a selected sequence of times for each LD source, and for receiving and temporarily storing numerical values therein. The LD receiver/processor 15 also includes an optional display interface 31 and display 33, connected to the microprocessor 21, for presenting a visually perceptible (numerical or graphical) display or audibly perceptible display of the location coordinates (x,y,z) and/or the clock offset parameters b and/or a, determined using the invention disclosed above. Optionally, the LD station apparatus 11 also includes a transmitter and/or receiver 41 and associated antenna 43, connected to the LD receiver/processor 15, for transmitting signals to and/or receiving signals from another receiver and/or transmitter that is spaced apart from the LD station 11.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz.

The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of about 266 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision BPR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 1200 longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System,* Van Nostrand Reinhold, 1992, pp. 1–90. The information in this reference is incorporated by reference herein.

I claim:

1. A method for determining location fix coordinates for a location determination (LD) station, the method comprising the steps of:

receiving LD signals from a plurality of LD signal sources at an LD station and determining a pseudorange value between the LD station and each LD signal source;

processing the pseudorange values to produce at least one linear relation that exactly relate location fix coordinates for the LD station to location coordinates of at least two of the LD signal sources, with no approximation; and using the at least one linear relation together with one pseudorange value to produce a nonlinear relation that exactly relates the location fix coordinates for the LD station to the location coordinates of at least one of the LD signal sources, from which the location fix coordinates can be calculated without iteration or approximation.

2. The method of claim 1, wherein said step of processing said pseudorange values to obtain said at least one linear relation comprises the steps of:

measuring a pseudorange value $PR(t=t_{r,n}; t_{s,n}; n)$ associated with an LD signal transmitted by LD signal source number n (n=1, 2, ..., N), where N is a selected integer at least equal to 2, at a selected time $t=t_{s,n}$ and received at said LD station at a selected receive time $t=t_{r,n}$, where the receive times $t_{r,n}$ (n=1, 2, ..., N) are approximately equal, where the pseudorange value for an LD signal received from LD signal source number n at the time $t=t_{r,n}$ is represented by a pseudorange equation of the form $$PR(t=t_{r,n}; t_{s,n}; n)+b=d_n=\{(x-x_n)^2+(y-y_n)^2+(z-z_n)^2\}^{1/2}==b-\chi(t_{r,n}; t_{s,n}; n),$$

that relates a distance $d_n$ from the LD signal source number n, having known spatial location coordinates $(x_n,y_n,z_n)=(x_n(t_{s,n}),y_n(t_{s,n}),z_n(t_{s,n}))$ at the selected time $t=t_{s,n}$, to said LD station, which has spatial location coordinates (x,y,z), where $b/c=\Delta t_{r,n}$ is an initially unknown error in the clock coordinate of said LD station, where $\chi(t_{r,n}; t_{s,n}; n)$ is a selected term with a known value that is determined from the measured pseudorange value for a signal transmitted from LD signal source number n and that compensates for at least one of (i) time delay, $I_{r,s,n}$, for LD signal propagation in the ionosphere, (ii) time delay, $T_{r,s,n}$, for LD signal propagation in the troposphere, and (iii) clock error $\Delta t_{s,n}$ associated with LD signal source number n, and where x, y, z and b are location fix coordinates, at least one of which is unknown and is to be determined; and processing the pseudorange equations for the pseudorange values $PR(t=t_{r,n}; t_{s,n}; n)$ to produce said at least one linear relation relating the location fix coordinates x, y, z and b, where the coefficients of said at least one linear relation are determinable from the selected terms $\chi(t_{r,n}; t_{s,n}; n)$ and are independent of the values of the location fix coordinates x, y, z and b.

3. The method of claim 1, wherein said step of using said linear relation to obtain said nonlinear relation comprises the steps of:

using said at least one linear relation relating said location fix coordinates x, y, z and b, together with at least one of said pseudorange representation equations for said pseudorange values $PR(t=t_{r,n}; t_{s,n}; n)$, to generate an equation that is nonlinear in said unknown value for a selected one of said location fix coordinates x, y, z and b and that does not depend on the values of said other three location fix coordinates;

determining a selected coordinate value from a solution of the nonlinear equation for said selected location fix coordinate, and using said selected location fix coordinate value in said at least one linear relation relating said location fix coordinates x, y, z and b to determine values of at least one other location fix coordinates that is unknown; and interpreting the values determined for said location fix coordinates x, y, z and b as the spatial location coordinates and receiver/processor clock error coordinate for said LD signal station at the time $t=t_{r,n}$.

4. The method of claim 1, further comprising the steps of:

selecting said integer N to be equal to at least 4;

expressing said at least one linear relation as at least three linear relations relating said solution location fix coordinates in the form $$H_{11}x+H_{12}y+H_{13}z=A'_{1,2}-B_{1,2}b,$$
    $$H_{21}x+H_{22}y+H_{23}z=A'_{1,3}-B_{1,3}b,$$
    $$H_{31}x+H_{32}y+H_{33}z=A'_{1,4}-B_{1,4}b,$$

where the coefficients $H_{ij}$ (i=1,2,3; j=1,2,3) are determined by said spatial location coordinates $(x_n,y_n,z_n)$ of said LD signal sources at said selected times $t=t_{s,n}$, and the coefficients $A'_{1,i}$ (i=2,3,4) and $B_{1,i}$ (i=2,3,4) are determined by said selected terms $\chi(t_{r,n}; t_{s,n}; n)$.

5. The method of claim 2, wherein said step of processing said pseudorange equations for said pseudorange values $PR(t=t_{r,n}; t_{s,n}; n)$ to produce said at least one linear relation relating said location fix coordinates to said location coordinates of said at least one LD signal source comprises the steps of:

selecting said integer N to be equal to at least 4;

forming three differences of the squares of pairs of said pseudorange equations for four selected LD signal sources n=m and n=ki (m≠ki; i=1,2,3; ki=1, . . . , N), and rearranging each of these differences in the form of a matrix equation $$\begin{bmatrix} \Delta x_{m,k1} & \Delta y_{m,k1} & \Delta z_{m,k1} \\ \Delta x_{m,k2} & \Delta y_{m,k2} & \Delta z_{m,k2} \\ \Delta x_{m,k3} & \Delta y_{m,k3} & \Delta z_{m,k3} \end{bmatrix} \begin{bmatrix} x \\ y \\ z \end{bmatrix} = \begin{bmatrix} A'_{m,k1} - B_{m,k1}b \\ A'_{m,k2} - B_{m,k2}b \\ A'_{m,k3} - B_{m,k3}b \end{bmatrix} = \{A' - Bb\},$$

where $x_{m,k}=(x_m+x_k)/2$, $\Delta x_{m,k}=(x_m-x_k)/2$, $y_{m,k}=(y_m+y_k)/2$, $\Delta y_{m,k}=(y_m-y_k)/2$, $z_{m,k}=(z_m+z_k)/2$, $\Delta z_{m,k}=(z_m-z_k)/2$, $A'_{m,k}=\chi(t_{r,m};t_{s,m};m)^2-\chi(t_{r,k};t_{s,k};k)^2, +x_{m,k}\Delta x_{m,k}++y_{m,k}\Delta y_{m,k}+z_{m,k}\Delta z_{m,k}$, $B_{m,k}=2[\chi(t_{r,m};t_{s,m};m)-\chi(t_{r,k};t_{s,k};k)]$;

determining an inverse matrix $H^{-1}$ of the 3×3 matrix $$H = \begin{bmatrix} \Delta x_{m,k1} & \Delta y_{m,k1} & \Delta z_{m,k1} \\ \Delta x_{m,k2} & \Delta y_{m,k2} & \Delta z_{m,k2} \\ \Delta x_{m,k3} & \Delta y_{m,k3} & \Delta z_{m,k3} \end{bmatrix};$$

applying the inverse matrix $H^{-1}$ to both sides of the second matrix equation to produce a matrix equation $$R = \begin{bmatrix} x \\ y \\ z \end{bmatrix} = H^{-1}\{A' - Bb\}.$$

6. The method of claim 2, further comprising the steps of:
selecting said integer N to be equal to at least 5;
for at least four distinct sets of said LD signals received from four of said LD signal sources, numbered n=j1, j2, j3, j4 with $1 \leq j1 < j2 < j3 < j4 \leq N$, determining said location coordinates $(x',y',z',b')_{j1,j2,j3,j4}$ of said LD station;
determining location coordinates $(x_c,y_c,z_c,b_c)$ of the center of a sphere in four-dimensional space that has a minimum radius $r_{min}$ and that contains all points having said location coordinates $(x',y',z',b')_{j1,j2,j3,j4}$ for the at least four distinct sets (j1,j2,j3,j4) of said LD signal sources; and
designating the location coordinates $(x_c,y_c,z_c,b_c)$ as said location fix coordinates of said LD station.

7. The method of claim 2, further comprising the steps of:
selecting said integer N to be equal to at least 5;
processing said pseudorange equations for said pseudorange values $PR(t=t_{r,n}; t_{s,n}; n)$ to produce N−1 linear relations of the form $$H_{k1}x+H_{k2}y+H_{k3}z=A'_{1,k+1}-B_{1,k+1}b \ (k=1, 2, \ldots, N-1),$$

where the coefficients $H_{kj}$ (k=1,2, . . . , N−1; j=1,2,3) are determined by said LD signal source location coordinates, and the coefficients $A'_{1,i}$ (i=2, . . . , N) and $B_{1,i}$ (i=2, . . . , N) are independent of the values of said location fix coordinates x, y, z and b;

forming an error expression $\epsilon$ of the form $$\varepsilon = w_1[H_{11}x + H_{12}y + H_{13}z - A'_{1,2} - B'_{1,2}b]^2 +$$
$$w_2[H_{21}x + H_{22}y + H_{23}z - A'_{1,3} - B_{1,3}b]^2 +$$
$$w_3[H_{31}x + H_{32}y + H_{33}z - A'_{1,4} - B_{1,4}b]^2 + \ldots +$$
$$w_{N-1}[H_{N-1,1}x + H_{N-1,2}y + H_{N-1,3}z - A'_{1,N} - B_{1,N}b]^2 -$$
$$w_N\{b - \chi(t_{r,1}; t_{s,1}; 1)\}^2,$$

where $w_1, w_2, \ldots, w_N$ are selected non-negative constants; and minimizing the value of the error expression $\epsilon$ with respect to choices of at least one of the values of said location fix coordinates x, y, z and b.

8. The method of claim 1, wherein said step of processing the pseudorange values to obtain said at least one linear relation comprises the steps of:

measuring a pseudorange value $PR(t=t_{r,n}; t_{s,n}; n)$ associated with an LD signal transmitted by LD signal source number n (n=1, 2, . . . , N), where N is a selected integer at least equal to 3, at a selected time $t=t_{s,n}$ and received at said LD station at a selected receive time $t=t_{r,n}$, where the receive times $t_{r,n}$ (n=1, 2, . . . , N) are approximately equal, where the pseudorange value for an LD signal received from LD signal source number n at the time $t=t_{r,n}$ is represented by a pseudorange equation of the form $$PR(t=t_{r,n}; t_{s,n}; n)+b=d_n=\{(x-x_n)^2+(y-y_n)^2+(z-z_n)^2\}^{1/2}==b-\chi(t_{r,n}; t_{s,n}; n),$$

that relates a distance $d_n$ from the LD signal source number n, having known spatial location coordinates $(x_n,y_n,z_n)=(x_n(t_{s,n}),y_n(t_{s,n}),z_n(t_{s,n}))$ at the selected time $t=t_{s,n}$, to said LD station, which has spatial location coordinates (x,y,z) with at least one of the spatial coordinates being known and the remainder being initially unknown, where $b/c=\Delta t_{r,n}$ is an initially unknown error in the clock coordinate of the LD station, where $\chi(t_{r,n}; t_{s,n}; n)$ is a selected term with a known value that is determined from the measured pseudorange value for the signal transmitted from the LD signal source number n and that compensates for at least one of (i) time delay, $I_{r,s,n}$ for LD signal propagation in the ionosphere, (ii) time delay, $T_{r,s,n}$ for LD signal propagation in the troposphere, and (iii) clock error $\Delta t_{s,n}$ associated with LD signal source number n, and where x, y, z and b are location fix coordinates to be determined; and processing the pseudorange equations for the pseudorange values $PR(t=t_{r,n}; t_{s,n}; n)$ to produce at least two linear relations relating the location fix coordinates x, y, z and b, where the coefficients of the at least two linear relations are determinable from the selected terms $\chi(t_{r,n}; t_{s,n}; n)$ and are independent of the values of the location fix coordinates x, y, z and b.

9. The method of claim 8, wherein said step of using said at least one linear relation to obtain said nonlinear relation comprises the steps of:

using said at least one linear relation relating said location fix coordinates x, y, z and b, together with at least one of said pseudorange representation equations for said pseudorange values $PR(t=t_{r,n}; t_{s,n}; n)$, to generate an equation that is nonlinear in an unknown value for a selected one of said initially unknown location fix coordinates and that does not depend on the values of said other location fix coordinates;

determining a selected coordinate value from a solution of the nonlinear equation for said selected location fix coordinate, and using the selected location fix coordinate value in said at least one linear relation relating said location fix coordinates x, y, z and b to determine values of said other unknown location fix coordinates; and interpreting the values determined for said location fix coordinates x, y, z and b as the spatial location coordinates and receiver/processor clock error coordinate for said LD signal station at the time $t=t_{r,n}$.

10. The method of claim 1, wherein said step of processing the pseudorange values to obtain said at least one linear relation comprises the steps of:

measuring a pseudorange value $PR(t=t_{r,n}; t_{s,n}; n)$ associated with an LD signal transmitted by LD signal source number n (n=1, 2, ..., N), where N is a selected integer at least equal to 3, at a selected time $t=t_{s,n}$ and received at said LD station at a selected receive time $t=t_{r,n}$, where the receive times $t_{r,n}$ (n=1, 2, ..., N) are approximately equal, where the pseudorange value for an LD signal received from LD signal source number n at the time $t=t_{r,n}$ is represented by a pseudorange equation of the form $$PR(t=t_{r,n}; t_{s,n}; n)+b=d_n=\{(x-x_n)^2+(y-y_n)^2+(z-z_n)^2\}^{1/2}==b-\chi(t_{r,n}; t_{s,n}; n),$$

that relates a distance $d_n$ from the LD signal source number n, having known spatial location coordinates $(x_n,y_n,z_n)=(x_n(t_{s,n}),y_n(t_{s,n}),z_n(t_{s,n}))$ at the selected time $t=t_{s,n}$, to said LD station, which has initially unknown spatial location coordinates (x,y,z), where $b/c=\Delta t_{r,n}$ is a known error in the clock coordinate of said LD station, where $\chi(t_{r,n}; t_{s,n}; n)$ is a selected term with a known value that is determined from the measured pseudorange value for a signal transmitted from LD signal source number n and that compensates for at least one of (i) time delay, $I_{r,s,n}$ for LD signal propagation signal in the ionosphere, (ii) time delay, $T_{r,s,n}$, for LD signal propagation in the troposphere, and (iii) clock error $\Delta t_{s,n}$ associated with LD signal source number n, and where x, y, z and b are location fix coordinates to be determined; and processing the pseudorange equations for the pseudorange values $PR(t=t_{r,n}; t_{s,n}; n)$ to produce at least two linear relations relating the location fix coordinates x, y, z and b, where the coefficients of the at least two linear relations are determinable from the selected terms $\chi(t_{r,n}; t_{s,n}; n)$ and are independent of the values of the location fix coordinates x, y, z and b.

11. The method of claim 10, wherein said step of using said linear relation to obtain said non-linear relation comprises the steps of:

using said at least two linear relations relating said location fix coordinates x, y, z and b, together with at least one of said pseudorange representation equations for said pseudorange values $PR(t=t_{r,n}; t_{s,n}; n)$, to generate an equation that is nonlinear in the unknown value for a selected one of said initially unknown location fix coordinates x, y and z that does not depend on the values of said other unknown location fix coordinates;

determining a selected coordinate value from a solution of the nonlinear equation for the selected location fix coordinate, and using the selected location fix coordinate value in said at least two linear relations relating said location fix coordinates x, y, z and b to determine values of said other unknown location fix coordinates; and interpreting the values determined for said location fix coordinates x, y, z and b as the spatial location coordinates and receiver/processor clock error coordinate for said LD signal station at the time $t=t_{r,n}$.

12. The method of claim 1, further comprising the step of selecting a first of said LD signal sources from a first Satellite Positioning System and selecting a second of said LD signal sources from a second Satellite Positioning System, where the first and second Satellite Positioning Systems differ from each other.

13. The method of claim 12, further comprising the step of selecting said first Satellite Positioning System to be a Global Positioning System and selecting said second Satellite Positioning System to be a Global Orbiting Navigational Satellite System.

14. The method of claim 1, further comprising the step of selecting a first of said LD signal sources from a Satellite Positioning System and selecting a second of said LD signal sources from a ground-based location determination system.

15. The method of claim 14, further comprising the step of selecting said Satellite Positioning System from the class consisting of a Global Positioning System and a Global Orbiting Navigational Satellite System.

16. The method of claim 14, further comprising the step of selecting said ground-based location determination system from the class consisting of a Loran signal system, a Tacan signal system, a Decca signal system, an Omega signal system, a JTIDS Relnav signal system and a Personal Location Reporting Service (PLRS) signal system.

17. The method of claim 1, further comprising the step of selecting said first and said second LD signal sources from a Satellite Positioning System.

18. Apparatus for determining the present location of a location determination station, the apparatus comprising:

a location determination (LD) station that receives LD signals from a plurality of LD signal sources and that determines a pseudorange value between the LD station and each LD signal source;

a microprocessor that communicates with the LD station and that is programmed:

to process the pseudorange values to produce at least one linear relation that exactly relates location fix coordinates for the LD station to location coordinates for at least two of the LD signal sources; and to use the at least one linear relation together with one pseudorange value to produce a nonlinear relation that exactly relates the location fix coordinates of the LD station to location coordinates of at least one of the LD signal sources, from which the location fix coordinates can be calculated without iteration or approximation.

19. The apparatus of claim 18, wherein said LD station and said microprocessor process said pseudorange values to obtain said at least one linear relation by:

measuring a pseudorange value PR(t=$t_{r,n}$; $t_{s,n}$; n) associated with an LD signal transmitted by LD signal source number n (n=1, 2, ..., N), where N is a selected integer at least equal to 2, at a selected time t=$t_{s,n}$ and received at said LD station at a selected receive time t=$t_{r,n}$, where the receive times $t_{r,n}$ (n=1, 2, ..., N) are approximately equal, where the pseudorange value for an LD signal received from LD signal source number n at the time t=$t_{r,n}$ is represented by a pseudorange equation of the form $$PR(t=t_{r,n}; t_{s,n}; n)+b=d_n\{(x-x_n)^2+(y-y_n)^2+(z-z_n)^2\}^{1/2}==b-\chi(t_{r,n}; t_{s,n}; n),$$

that relates a distance $d_n$ from the LD signal source number n, having known spatial location coordinates $(x_n,y_n,z_n)=(x_n(t_{s,n}),y_n(t_{s,n}),z_n(t_{s,n}))$ at the selected time t=$t_{s,n}$, to said LD station, which has spatial location coordinates (x,y,z), where b/c=$\Delta t_{r,n}$ is an initially unknown error in the clock coordinate of said LD station, where $\chi(t_{r,n}; t_{s,n}; n)$ is a selected term with a known value that is determined from the measured pseudorange value for a signal transmitted from LD signal source number n and that compensates for at least one of (i) time delay, $I_{r,s,n}$, for LD signal propagation in the ionosphere, (ii) time delay, $T_{r,s,n}$, for LD signal propagation in the troposphere, and (iii) clock error $\Delta t_{s,n}$ associated with LD signal source number n, and where x, y, z and b are location fix coordinates, at least one of which is unknown and is to be determined; and processing the pseudorange equations for the pseudorange values PR(t=$t_{r,n}$; $t_{s,n}$; n) to produce said at least one linear relation relating the location fix coordinates x, y, z and b, where the coefficients of said at least one linear relation are determinable from the selected terms $\chi(t_{r,n}; t_{s,n}; n)$ and are independent of the values of the location fix coordinates x, y, z and b.

20. The apparatus of claim 19, wherein said microprocessor uses said linear relation to obtain said nonlinear relation by:

using said at least one linear relation relating said location fix coordinates x, y, z and b, together with at least one of said pseudorange representation equations for said pseudorange values PR(t=$t_{r,n}$; $t_{s,n}$; n), to generate an equation that is nonlinear in the unknown value for a selected one of said location fix coordinates x, y, z and b and that does not depend on the values of said other three location fix coordinates;

determining a selected coordinate value from a solution of the nonlinear equation for the selected location fix coordinate, and using the selected location fix coordinate value in said at least one linear relation relating said location fix coordinates x, y, z and b to determine values of other three location fix coordinates that are unknown; and interpreting the values determined for said location fix coordinates x, y, z and b as the spatial location coordinates and receiver/processor clock error coordinate for said LD signal station at the time t=$t_{r,n}$.

21. The apparatus of claim 20, said integer N is selected to be equal to at least 4 and said microprocessor is further programmed:

to express said at least one linear relation as at least three linear relations relating said solution location fix coordinates in the form $$H_{11}x+H_{12}y+H_{13}z=A'_{1,2}-B_{1,2}b,$$
$$H_{21}x+H_{22}y+H_{23}z=A'_{1,3}-B_{1,3}b,$$
$$H_{31}x+H_{32}y+H_{33}z=A'_{1,4}-B_{1,4}b,$$

where the coefficients $H_{ij}$ (i=1,2,3; j=1,2,3) are determined by said spatial location coordinates $(x_n,y_n,z_n)$ of said LD signal sources at said selected times t=$t_{s,n}$, and the coefficients $A'_{1,i}$ (i=2,3,4) and $B_{1,i}$ (i=2,3,4) are determined by said selected terms $\chi(t_{r,n}; t_{s,n}; n)$.

22. The apparatus of claim 20, wherein said integer N is selected to be equal to at least 4 and said microprocessor is programmed:

to form three differences of the squares of pairs of said pseudorange equations for four selected LD signal sources n=m and n=ki (m≠ki; i=1,2,3; ki=1, ..., N), and rearranging each of these differences in the form of a matrix equation $$\begin{bmatrix} \Delta x_{m,k1} & \Delta y_{m,k1} & \Delta z_{m,k1} \\ \Delta x_{m,k2} & \Delta y_{m,k2} & \Delta z_{m,k2} \\ \Delta x_{m,k3} & \Delta y_{m,k3} & \Delta z_{m,k3} \end{bmatrix} \begin{bmatrix} x \\ y \\ z \end{bmatrix} = \begin{bmatrix} A'_{m,k1} - B_{m,k1}b \\ A'_{m,k2} - B_{m,k2}b \\ A'_{m,k3} - B_{m,k3}b \end{bmatrix} = \{A - Bb\},$$

where $x_{m,k}=(x_m+x_k)/2,$ $\Delta x_{m,k}=(x_m-x_k)/2,$ $y_{m,k}=(y_m+y_k)/2,$ $\Delta y_{m,k}=(y_m-y_k)/2,$ $z_{m,k}=(z_m+z_k)/2,$ $\Delta z_{m,k}=(z_m-z_k)/2,$ $A'_{m,k}=\chi(t_{r,m};t_{s,m};m)^2-\chi(t_{r,k};t_{s,k};k)^2, +x_{m,k}\Delta x_{m,k}++y_{m,k}\Delta y_{m,k}+z_{m,k}\Delta z_{m,k},$ $B_{m,k}=2[\chi(t_{r,m};t_{s,m};m)-\chi(t_{r,k};t_{s,k};k)];$ to determine an inverse matrix $H^{-1}$ of the 3×3 matrix $$H = \begin{bmatrix} \Delta x_{m,k1} & \Delta y_{m,k1} & \Delta z_{m,k1} \\ \Delta x_{m,k2} & \Delta y_{m,k2} & \Delta z_{m,k2} \\ \Delta x_{m,k3} & \Delta y_{m,k3} & \Delta z_{m,k3} \end{bmatrix};$$

and to apply the inverse matrix $H^{-1}$ to both sides of the second matrix equation to produce a matrix equation $$R = \begin{bmatrix} x \\ y \\ z \end{bmatrix} = H^{-1}\{A' - Bb\}.$$

23. The apparatus of claim 20, wherein said integer N is selected to be equal to at least 5 and said microprocessor is programmed:

for at least four distinct sets of said LD signals received from four of said LD signal sources, numbered n=j1, j2, j3, j4 with 1≦j1<j2<j3<j4≦N, to determine said location coordinates $(x',y',z',b')_{j1,j2,j3,j4}$ of said LD station;

to determine location coordinates $(x_c,y_c,z_c,b_c)$ of the center of a sphere in four-dimensional space that has a minimum radius $r_{min}$ and that contains all points having the location coordinates $(x',y',z',b')_{j1,j2,j3,j4}$ for the at least four distinct sets (j1,j2,j3,j4) of said LD signal sources; and to designate the location coordinates $(x_c, y_c, z_c, b_c)$ as said location fix coordinates of said LD station.

24. The apparatus of claim 20, wherein said integer N is selected to be equal to at least 5 and said microprocessor is programmed:

to process said pseudorange equations for said pseudorange values $PR(t=t_{r,n}; t_{s,n}; n)$ to produce N−1 linear relations of the form $$H_{k1}x + H_{k2}y + H_{k3}z = A'_{1,k+1} - B_{1,k+1}b \quad (k=1, 2, \ldots, N-1),$$

where the coefficients $H_{kj}$ (k=1,2, ..., N−1; j=1,2,3) are determined by said LD signal source location coordinates, and the coefficients $A'_{1,i}$ (i=2, , ..., N) and $B_{1,i}$ (i=2, ..., N) are independent of the values of said location fix coordinates x, y, z and b;

to form an error expression $\epsilon$ of the form $$\begin{aligned}\varepsilon = {} & w_1[H_{11}x + H_{12}y + H_{13}z - A'_{1,2} - B'_{1,2}b]^2 + \\ & w_2[H_{21}x + H_{22}y + H_{23}z - A'_{1,3} - B_{1,3}b]^2 + \\ & w_3[H_{31}x + H_{32}y + H_{33}z - A'_{1,4} - B_{1,4}b]^2 + \ldots + \\ & w_{N-1}[H_{N-1,1}x + H_{N-1,2}y + H_{N-1,3}z - A'_{1,N} - B_{1,N}b]^2 - \\ & w_N\{b - \chi(t_{r,1}; t_{s,1}; 1)\}^2,\end{aligned}$$

where $w_1, w_2, \ldots, w_N$ are selected non-negative constants; and to minimize the value of the error expression $\epsilon$ with respect to choices of at least one of the values of said location fix coordinates x, y, z and b.

* * * * *